United States Patent [19]

Carpenter et al.

[11] Patent Number: 5,771,540
[45] Date of Patent: Jun. 30, 1998

[54] EQUILIBRATED HINGE WITH VARIABLE FRICTIONAL TORQUE

[75] Inventors: David A. Carpenter, Clarksville, Md.; Mikhail Gelfand, Milford, Conn.; Edward T. Rude, Columbia, Md.

[73] Assignee: TorqMaster, Inc., Stamford, Conn.

[21] Appl. No.: 785,927

[22] Filed: Jan. 22, 1997

[51] Int. Cl.$^6$ .................................................. E05F 1/08
[52] U.S. Cl. ............................................. 16/308; 16/299
[58] Field of Search ............................. 16/308, 321, 322, 16/298, 299, 300, 342

[56]                     References Cited

U.S. PATENT DOCUMENTS

| | | | |
|---|---|---|---|
| 1,102,556 | 7/1914 | Swartz ........................................ | 16/308 |
| 3,209,391 | 10/1965 | Mangini ..................................... | 16/300 |
| 3,787,923 | 1/1974 | Peterson .................................... | 16/308 |
| 3,965,533 | 6/1976 | Frohlich ..................................... | 16/300 |
| 5,079,799 | 1/1992 | Rude et al. . | |
| 5,231,734 | 8/1993 | Rude . | |
| 5,333,355 | 8/1994 | Beswick et al. ........................... | 16/300 |
| 5,393,160 | 2/1995 | Ojima ........................................ | 16/308 |
| 5,515,876 | 5/1996 | Warner et al. ............................ | 16/308 |

FOREIGN PATENT DOCUMENTS

| | | | |
|---|---|---|---|
| 2325987 | 12/1973 | Germany .................................. | 16/308 |
| 178480 | 7/1990 | Japan ....................................... | 16/308 |
| 9010818 | 9/1990 | WIPO ...................................... | 16/308 |

*Primary Examiner*—Chuck Mah
*Attorney, Agent, or Firm*—Gottlieb, Rackman & Reisman, P.C.

[57]                     ABSTRACT

A hinge that provides equilibration and variable friction for a display screen or a laptop lid. In the preferred embodiment, a torsion rod provides a restoring force which increases as the lid is moved either direction from its vertical position. A friction hinge, of well know design, uses a spring band about a shaft. One end of the torsion rod is coupled to the end of the band of the friction hinge, so that the moment in the torsion rod increases or decreases the moment in the spring band of the hinge, modifying the frictional torque accordingly. This allows the frictional torque to be low as the lid is first opened, and larger as the display reaches the useful range of its motion.

19 Claims, 4 Drawing Sheets

EQUILIBRATED HINGE WITH VARIABLE FRICTIONAL TORQUE

This invention relates to friction hinges for such devices as electronic displays and other objects requiring accurate, but adjustable angular positioning.

BACKGROUND OF THE INVENTION

Friction hinges are used to mount displays to the bases of laptops. The frictional torque they provide holds the displays in position during use. This frictional torque must be sufficient to keep the display from falling, even when the laptop is lightly bumped or bounced. Most prior art hinges in use today provide torque which remains essentially constant over their angular range of motion. This results in the need, by the user, to overcome this torque when opening the laptop. Laptop computers have become progressively lighter, but their displays have not kept pace in so far as weight reduction is concerned. Modern color displays now constitute a larger fraction of the total weight of laptops than did those of a few years ago. If sufficient frictional torque is provided to hold the lid satisfactorily in position during use then, using the hinges of the prior art which provide constant torque, the base of the laptop may lift as the user attempts to open the lid, requiring the user to hold the base down with one hand while the other hand raises the lid. This is regarded by users as a deficiency, and laptop manufacturers are eager for a solution to this problem.

Torsion rods have been used to alleviate this problem by affixing one end of the rod to the lid and the other to the base. The torsion rod is in its relaxed position when the lid is open or partially open. As the lid is closed, the torsion rod is wound. Some of the force required to wind the torsion rod comes from the weight of the lid; the remainder is provided by the user. When closed, a latch or a detent keeps the lid closed. When the lid is opened, torque from the torsion rod holds down the base and assists in opening the lid. Touch-screen applications required additional torque to resist the pressure exerted on the screen during operation, and the increase in torque for the open positions is of great advantage in those cases.

SUMMARY OF THE INVENTION

In the present invention, a torsion rod is used as described above except that one end of the torsion rod is attached to an element of the friction hinge to control the torque so that the friction is low as the lid is first opened, and progressively enhanced as the display reaches the useful range of its motion. U.S. Pat. No. 5,231,734 discloses a hinge whose friction can be controlled by the application of controlled forces at the end of its helical band. This invention provides a method of obtaining the advantages of torsion-rod equilibration with variable torque.

Accordingly, it is an object of our invention to provide a hinge for a laptop computer, or other similar devices requiring stable and accurate positioning, that has the combined benefits of equilibration and variable frictional hinge torque.

It is a further object of this invention to provide a hinge for laptop computers or similar devices that pops open slightly from the closed and latched position when the latch is released.

It is yet a further object of our invention to provide an equilibrated hinge which develops frictional torque appropriate to the various lid positions encountered in use.

It is a still further object of the invention to provide a hinge with greater frictional torque for lid positions in the range of normal use.

A further object of our invention is to provide a hinge with minimal frictional torque to be overcome as the lid is closed.

And finally, it is an object of our invention to provide spring support to prevent the lid from slamming closed.

Other objects and advantages of our invention will become apparent from the descriptions that follow.

BRIEF DESCRIPTION OF THE DRAWINGS

Further understanding of our invention will become apparent upon consideration of the following detailed description in conjunction with the drawings, in which.

DETAILED DESCRIPTION OF THE INVENTION

Figure 1:
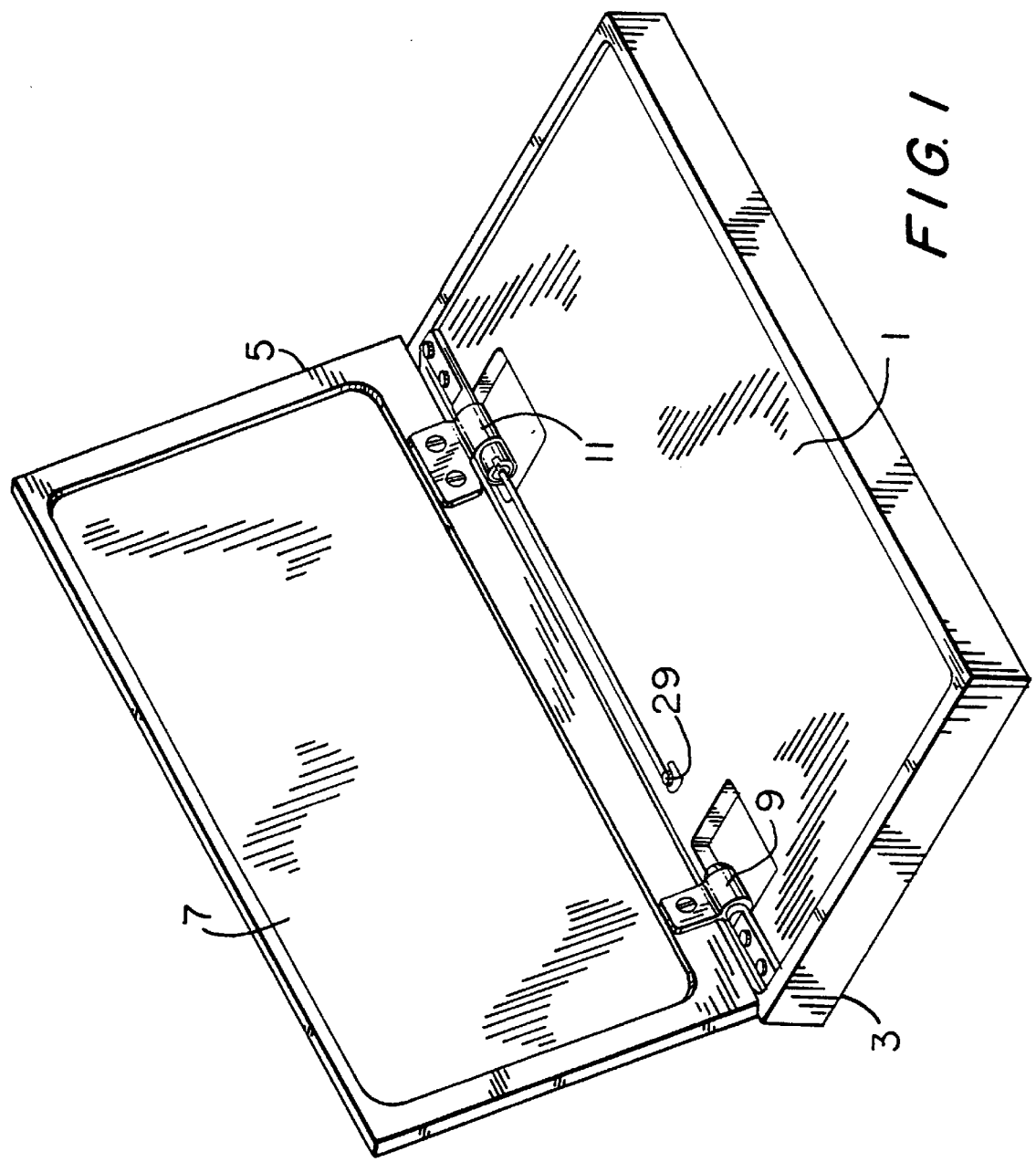
FIG. 1 is a representative outline perspective drawing of a laptop computer having no covering over the hinge elements and with the lid in an open position so that the display would be in position for use.

Referring now to FIG. 1, laptop computer 1 consists of two major components that must be rotatably connected, one to the other, base 3 and lid 5. Lid 5 contains display 7. Lid 5 and base 3 are mechanically connected by pivot 9 on the left side and by the inventive friction hinge 11 on the right side.

Pivot 9 can be a conventional hinge of any convenient design. It may provide frictional torque, or it may be a simple torque free hinge, according to the requirement. Friction hinge 11 is more easily understood by an examination of FIG. 2, in which its four parts are shown in exploded view. Shaft 21 is fastened to base 3 and band 23 is fastened to lid 5. Shaft 21 and band 23 together comprise a conventional friction hinge in which band 23 is tightly wrapped about shaft 21 to produce frictional torque which tends to resist rotation of those elements with respect to one another.

Figure 3:
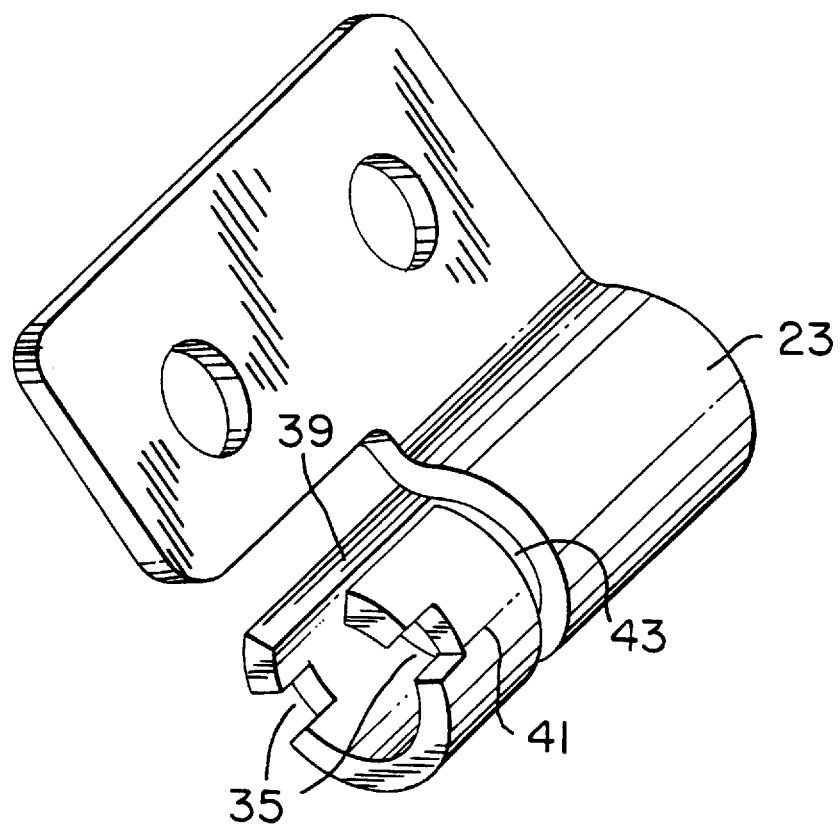
FIG. 3 is a perspective view of the band of our inventive hinge.

One end of torsion rod 25 is connected to base 3. In this instance, this has been accomplished by forming loop 27 in the end of the torsion rod and fastening it to base 1 with screw 29, however, any convenient connection method could be used instead. Driver 31 has ears 33 which fit closely into matching notches 35 in band 23 which are best seen in FIG. 3. Driver 31 is fastened to the other end, 37, of torsion rod 25 by any suitable connection method such as swaging, or crimping. It is also possible to form the torsion rod prior to heat treatment to form the driver and torsion rod as one piece. The objective is that the moment produced in torsion rod 25 act on end 39 of band 23. To further that objective, slot 43 has been cut into band 23, separating part 41 of band 23 from the main body of the band except near end 39. Because of this separation, part 41 of band 23 acts as a socket to receive driver 31 and to form a torsionally rigid connection between end 37 of torsion rod 25 and end 39 of band 23.

Friction hinges of the type formed by shaft 21 and band 23 are in frequent use, and are well known to those skilled in the art. And, as mentioned above, torsion rods have often been used to equilibrate the weight of such things as lids and covers. The distinguishing feature of our inventive hinge is the connection of the torsion rod to the friction hinge in such a way that the torsion rod changes the amount of frictional torque provided by the hinge during the rotation of the lid.

Wrap band friction hinges obey the well-known relationship:

$$T = M \exp(uA)$$

in which:
T=torque,
M=moment in the band,
u=the coefficient of friction between the band and the shaft, and
A=the angle of wrap of the band about the shaft.

Any moment applied at the free end of the band alters M, increasing or decreasing the resulting torque according to the magnitude and sign of M, so that M=M(band)+M(end). M(band) is the moment in the band produced by its expansion when it is placed over the shaft, and N(end) is any moment applied to the end of the band.

In a preferred embodiment of our inventive friction hinge the torsion rod is in its relaxed condition when lid 5 is vertical, perpendicular to base 3. As lid 5 is closed, torsion rod 25 becomes wound, producing a restoring torque which tends to support the weight of lid 5. The resulting moment acts at end 39 of band 23 to reduce the frictional torque in the hinge which becomes lower as the lid is closed. When opening the lid from the fully closed position, due to the moment stored in the torsion rod which acts on the end of the band, the friction hinge produces minimum torque, while the torsion rod exerts maximum torque to help raise the lid and prevent the base from lifting. When the lid reaches a vertical position, the torsion rod is again relaxed, and the friction hinge produces friction according to the moment stored in the band. As the lid is moved past vertical, approaching the position that would be normal for use in a laptop application, the torsion rod is wound in a direction that produces torque tending to lift the lid back toward the vertical position. In addition, the moment produced in the torsion rod now acts to increase the frictional torque produced by the hinge which helps to keep the lid and the display in position during use. This combination of torque from the friction hinge and from the torsion rod provides extra stability for the display in the most critical position, particularly for touch-screen applications. The unique combination of torque due to the action of the friction hinge and the torsion spring and the control of the frictional torque by the torsion rod allows high holding torque when it is most needed while providing lower torque as the lid is closed, and substantially reduced torque for both directions of motion when the lid is near the closed position. An additional advantage is that, in the closed position, the torque from the torsion rod combined with the low friction hinge torque due to the action of the torsion rod on the band, causes the lid to pop up slightly when the latch is released. This feature has been much sought after by laptop designers.

Experience with our inventive hinge has shown that it is practical to achieve a variation of three to one in torque from the fully closed position to a position with the lid opened 135 degrees, which is about where laptop lids are usually positioned while in use.

For applications such as laptop lids, it is always important that there be little or no lost motion in the frictional torque that controls the lid, but for certain applications some amount of dead band will be desirable in the torque due to the torsion rod. This allows more options in matching the torque profile of the hinge to the application. Continuously varying torque can be achieved from the combination of the friction hinge and the torsion rod, acting to produce a restoring torque and also to control the torque of the friction hinge. In this instance, no dead band is wanted. This is achieved by providing torsionally rigid connections between torsion rod 25 and base 3, and between torsion rod 25 and end 39 of the band. Lost motion in any of these connections will result in a dead band through which the frictional torque will equal the frictional torque of the hinge with no load in the torsion rod. This torque is that given by the above equation when M=M(band). Dead band can be achieved simply by leaving clearance under screw 29, or by looseness in the connections at right end 37 of torsion rod 25.

Figure 2:
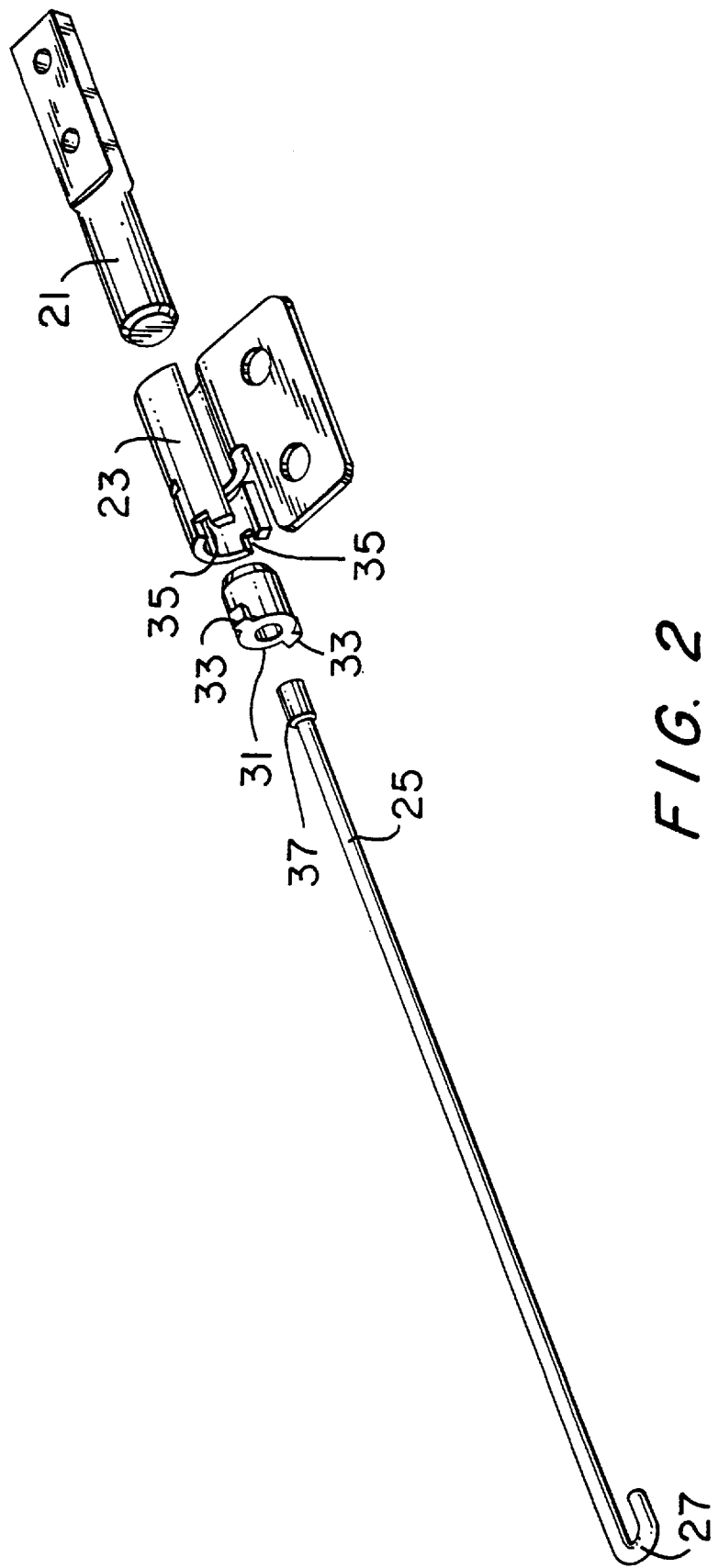
FIG. 2 is an exploded perspective view of the elements of our inventive hinge.
Figure 4:
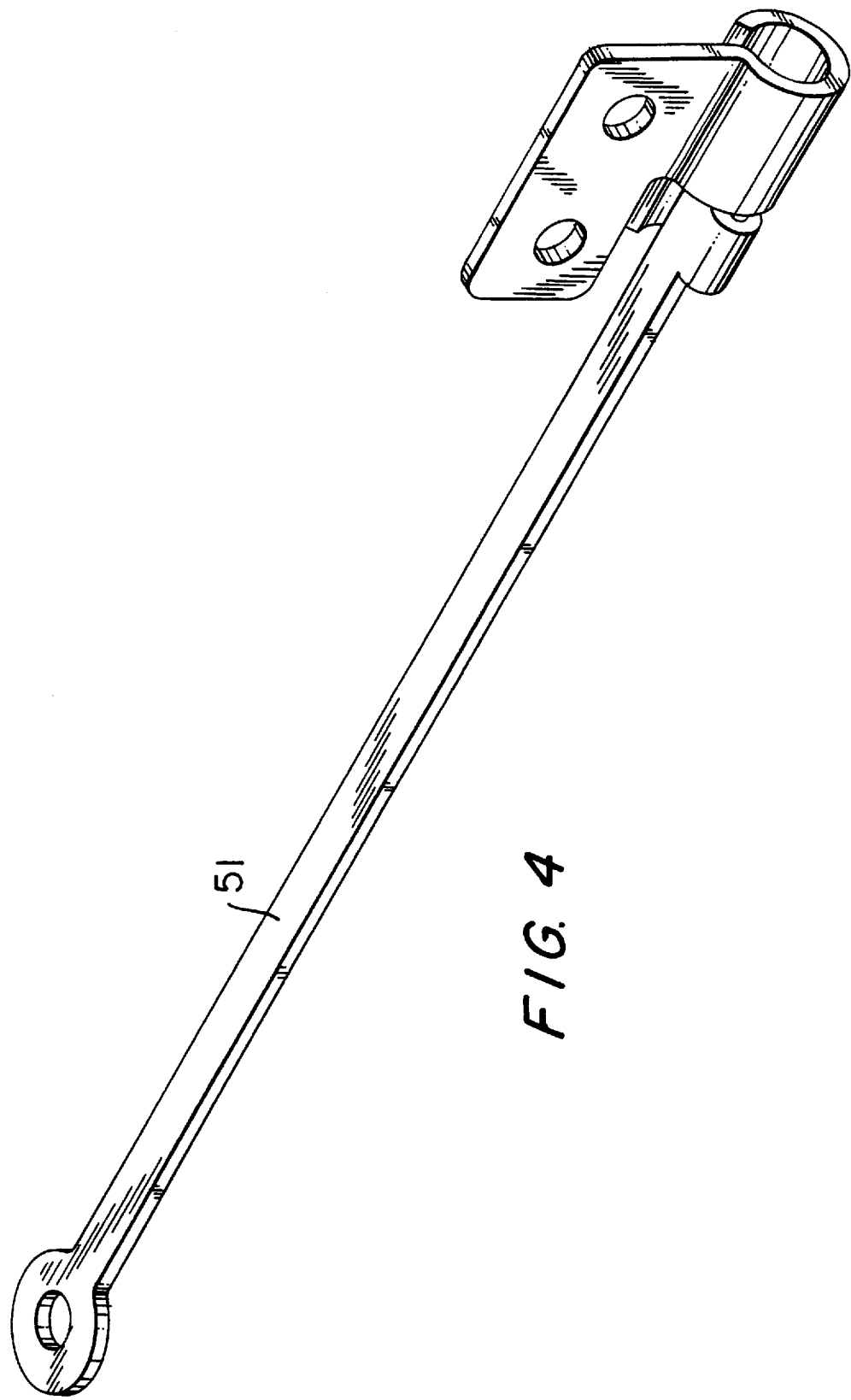
FIG. 4 is a perspective view of an alternative embodiment of the band of the inventive hinge.

FIG. 4 depicts a one-piece band which can be used in place of the assembly whose parts are shown in FIG. 2. This band has torsion rod portion 51 formed as a part of the band itself. This method eliminates the separate torsion rod and driver, and the assembly steps required to produce the assembly of those parts. On the other hand, the one-piece band entails more scrap from the sheet metal blanking operations, and the forming is more difficult. In addition, the heat treatment of the one-piece band can be more troublesome because the requirements of the torsion rod and the friction hinge band portions of the part differ somewhat.

It will thus be seen that the objects set forth above among those made apparent from the preceding description, are efficiently attained and, since certain changes may be made in the construction of the inventive spring clutch without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. A friction hinge assembly comprising:
   a first member and a second member rotatable connected thereto to enable said first member to be disposed at varying angular positions relative to said second member;
   a shaft fixed to said first member;
   at least one substantially annular band frictionally wrapped about said shaft and fastened to said second member;
   a torsion rod having one end connected to said first member and the other end coupled to said at least one band for selectively adjusting frictional torque exerted between said band and said shaft as a function of the angular position of said first member relative to said second member when frictionally rotating said band with respect to said shaft.

2. The assembly of claim 1, wherein said one end of said torsion rod is formed with a loop adapted for fastening to said first member.

3. The assembly of claim 1, further including a driver element fixed to said other end of said torsion rod for selective engagement with said at least one annular band.

4. The assembly of claim 3, wherein said driver element includes means for selective coupling with at least one notch of said band.

5. The assembly of claim 3, wherein said torsion rod and said driver element are formed as one piece.

6. The assembly of claim 3, wherein said band is divided into a first part and a second part.

7. The assembly of claim 6, wherein one of said parts acts as a socket for selectively receiving said driver element of said torsion rod end in order to form a torsionally rigid connection therebetween.

8. The assembly of claim 6, wherein said band includes a slot which separates said first part from said second part.

9. The assembly of claim 1, wherein said band and said torsion rod are formed as one piece.

10. A friction hinge assembly comprising:

a shaft;

at lease one substantially annular band frictionally wrapped about said shaft; and a torsion rod having one end coupled to said at least one band for selectively adjusting frictional torque exerted between said band and said shaft when frictionally rotating said band about said shaft.

11. The assembly of claim 10, further including a driver element fixed to the end of said torsion rod for selective engagement with said at least one annular band.

12. The assembly of claim 11, wherein said torsion rod and said driver element are formed as one piece.

13. The assembly of claim 11, wherein said band is divided into a first part and a second part.

14. The assembly of claim 13, wherein said band includes a slot which separates said first part from said second part.

15. The assembly of claim 11, wherein said band includes a socket for selective engagement with the end of said torsion rod.

16. The assembly of claim 10, wherein said band and said torsion rod are formed as one piece.

17. A friction hinge assembly comprising:

a shaft;

at least one substantially annular band frictionally wrapped about said shaft; and a torsion rod including the driver element at one end thereof coupled to said annular band for selectively adjusting frictional torque exerted between said band and said shaft when frictionally rotating said band with respect to said shaft.

18. The assembly of claim 17, wherein said torsion rod and the driver element are formed as one piece.

19. The assembly of claim 17, wherein said annular band includes a socket portion for selective reception of said driver element.

* * * * *